US011615587B2

(12) United States Patent
Kuo et al.

(10) Patent No.: US 11,615,587 B2
(45) Date of Patent: Mar. 28, 2023

(54) OBJECT RECONSTRUCTION WITH TEXTURE PARSING

(71) Applicant: QUALCOMM Incorporated, San Diego, CA (US)

(72) Inventors: Chieh-Ming Kuo, Taoyuan (TW); Ke-Li Cheng, San Diego, CA (US); Michel Adib Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/994,481

(22) Filed: Aug. 14, 2020

(65) Prior Publication Data

US 2021/0390770 A1 Dec. 16, 2021

Related U.S. Application Data

(60) Provisional application No. 63/038,801, filed on Jun. 13, 2020.

(51) Int. Cl.
*G06T 17/00* (2006.01)
*G06T 7/60* (2017.01)
*G06T 7/90* (2017.01)
*G06V 40/16* (2022.01)

(52) U.S. Cl.
CPC .............. *G06T 17/00* (2013.01); *G06T 7/60* (2013.01); *G06T 7/90* (2017.01); *G06V 40/168* (2022.01); *G06T 2219/2012* (2013.01)

(58) Field of Classification Search
CPC .. G06T 17/00; G06T 7/60; G06T 7/90; G06T 2219/2012; G06T 15/04; G06V 40/168
See application file for complete search history.

(56) References Cited

U.S. PATENT DOCUMENTS

2019/0080508 A1* 3/2019 Johnson ................. G06T 15/50
2021/0358212 A1* 11/2021 Vesdapunt ............. G06T 19/20

FOREIGN PATENT DOCUMENTS

WO WO 99/64961 * 6/1999

OTHER PUBLICATIONS

International Search Report and Written Opinion—PCT/US2021/032701—ISA/EPO—dated Sep. 28, 2021.
(Continued)

*Primary Examiner* — Qian Yang
(74) *Attorney, Agent, or Firm* — Polsinelli LLP

(57) ABSTRACT

Techniques are provided for generating one or more three-dimensional (3D) models. In one example, an image of an object (e.g., a face or other object) is obtained, and a 3D model of the object in the image is generated. The 3D model includes geometry information. Color information for the 3D model is determined, and a fitted 3D model of the object is generated based on a modification of the geometry information and the color information for the 3D model. In some cases, the color information (e.g., determination and/or modification of the color information) and the fitted 3D model can be based on one or more vertex-level fitting processes. A refined 3D model of the object is generated based on the fitted 3D model and depth information associated with the fitted 3D model. In some cases, the refined 3D model can be based on a pixel-level refinement or fitting process.

30 Claims, 13 Drawing Sheets

(56) References Cited

OTHER PUBLICATIONS

Jiang L., et al., "3D Face Reconstruction with Geometry Details from a Single Image", arxiv .org, Cornell University Library, 201 Olin Library Cornell University Ithaca, NY 14853, Feb. 18, 2017 (Feb. 18, 2017), XP081150430, pp. 1-14, DOI: 10.1109/TIP.2018. 2845697 Abstract Sections I., IV. VI. Figures 2. 3. 6.
Rotger G., et al., "Detailed 3D Face Reconstruction from a Single RGB Image", Journal of WSCG, vol. 27, No. 2, May 4, 2019 (May 4, 2019), pp. 103-112, XP055841930, Plzen, Czech Republic ISSN: 1213-6972, DOI:10.24132/JWSCG.2019.27.2.3, Abstract Sections 3.1-3.3, figures 1, 2, 10 Pages.
Tewari A., et al., "Self-Supervised Multi-Level Face Model Learning for Monocular Reconstruction at Over 250 Hz", 2018 IEEE/CVF Conference on Computer Vision And Pattern Recognition, IEEE, Jun. 18, 2018 (Jun. 18, 2018), pp. 2549-2559, XP033476221, DOI: 10.1109/CVPR.2018.00270, [retrieved on Dec. 14, 2018] abstract section 3, 4, 4.1, 6.2 figure 2, 11 Pages.
Wu F., et al., "Model-Based Face Reconstruction Using SIFT Flow Registration and Spherical Harmonics", 2016 23rd International Conference on pattern Recognition (ICPR), IEEE, Dec. 4, 2016 (Dec. 4, 2016), pp. 1774-1779, XP033085844, DOI: 10.1109/ICPR. 2016.7899893 retrieved on Apr. 13, 2017] abstract sections II.A, II.B, III, IIIA, III.C, IV, figures 1, 5.

\* cited by examiner

1100

```
┌─────────────────────────────────────────────┐
│      OBTAIN AN IMAGE OF AN OBJECT            │
│                 1102                         │
└─────────────────────────────────────────────┘
                      │
                      ▼
┌─────────────────────────────────────────────┐
│  GENERATE A 3D MODEL OF THE OBJECT IN THE    │
│  IMAGE, THE 3D MODEL INCLUDING GEOMETRY      │
│              INFORMATION                     │
│                 1104                         │
└─────────────────────────────────────────────┘
                      │
                      ▼
┌─────────────────────────────────────────────┐
│  DETERMINE COLOR INFORMATION FOR THE 3D MODEL│
│                 1106                         │
└─────────────────────────────────────────────┘
                      │
                      ▼
┌─────────────────────────────────────────────┐
│ GENERATE A FITTED 3D MODEL OF THE OBJECT     │
│ BASED ON A MODIFICATION OF THE GEOMETRY      │
│ INFORMATION AND THE COLOR INFORMATION FOR    │
│             THE 3D MODEL                     │
│                 1108                         │
└─────────────────────────────────────────────┘
                      │
                      ▼
┌─────────────────────────────────────────────┐
│ GENERATE A REFINED 3D MODEL OF THE OBJECT    │
│ BASED ON THE FITTED 3D MODEL AND DEPTH       │
│ INFORMATION ASSOCIATED WITH THE FITTED 3D    │
│                 MODEL                        │
│                 1110                         │
└─────────────────────────────────────────────┘
```

FIG. 11

OBJECT RECONSTRUCTION WITH TEXTURE PARSING

CROSS-REFERENCE TO RELATED APPLICATIONS

This application claims the benefit of U.S. Provisional Application No. 63/038,801, filed Jun. 13, 2020, which is hereby incorporated by reference in its entirety and for all purposes.

FIELD

The present disclosure generally relates to image processing, and more specifically to techniques and systems for performing object reconstruction with texture parsing.

BACKGROUND

Many devices and systems allow a scene to be captured by generating images (also referred to as frames) and/or video data (including multiple images or frames) of the scene. For example, a camera or a computing device including a camera (e.g., a mobile device such as a mobile telephone or smartphone including one or more cameras) can capture a sequence of images of a scene. The image and/or video data can be captured and processed by such devices and systems (e.g., mobile devices, IP cameras, etc.) and can be output for consumption (e.g., displayed on the device and/or other device). In some cases, the image and/or video data can be captured by such devices and systems and output for processing and/or consumption by other devices.

An image can be processed (e.g., using object detection, recognition, segmentation, etc.) to determine any objects that are present in the image, which can be useful for many applications. For instance, a model can be determined for representing an object in an image, and can be used to facilitate effective operation of various systems. Examples of such applications and systems include augmented reality (AR), robotics, automotive and aviation, three-dimensional scene understanding, object grasping, object tracking, in addition to many other applications and systems.

SUMMARY

In some examples, techniques and systems are described for processing one or more images and performing object reconstruction with texture parsing for one or more objects in the image(s). According to at least one illustrative example, a method of generating one or more three-dimensional (3D) models is provided. The method includes: obtaining an image of an object; generating a 3D model of the object in the image, the 3D model including geometry information; determining color information for the 3D model; generating a fitted 3D model of the object based on a modification of the geometry information and the color information for the 3D model; and generating a refined 3D model of the object based on the fitted 3D model and depth information associated with the fitted 3D model.

In another example, an apparatus for processing one or more images is provided that includes a memory (e.g., configured to store image data of at least one image) and one or more processors implemented in circuitry and coupled to the memory. The one or more processors are configured to and can: obtain an image of an object; generate a 3D model of the object in the image, the 3D model including geometry information; determine color information for the 3D model; generate a fitted 3D model of the object based on a modification of the geometry information and the color information for the 3D model; and generate a refined 3D model of the object based on the fitted 3D model and depth information associated with the fitted 3D model.

In another example, a non-transitory computer-readable medium is provided that has stored thereon instructions that, when executed by one or more processors, cause the one or more processors to: obtain an image of an object; generate a 3D model of the object in the image, the 3D model including geometry information; determine color information for the 3D model; generate a fitted 3D model of the object based on a modification of the geometry information and the color information for the 3D model; and generate a refined 3D model of the object based on the fitted 3D model and depth information associated with the fitted 3D model.

In another example, an apparatus for processing one or more images is provided. The apparatus includes: means for obtaining an image of an object; means for generating a 3D model of the object in the image, the 3D model including geometry information; means for determining color information for the 3D model; means for generating a fitted 3D model of the object based on a modification of the geometry information and the color information for the 3D model; and means for generating a refined 3D model of the object based on the fitted 3D model and depth information associated with the fitted 3D model.

In some aspects, the color information includes albedo color.

In some aspects, generating the 3D model of the object includes: obtaining a generic object model; identifying landmarks of the object in the image; and generating the 3D model by fitting the generic object model to the object in the image using the identified landmarks of the object.

In some aspects, generating the fitted 3D model of the object and determining the color information for the 3D model includes: performing at least one vertex-level fitting of the 3D model, the at least one vertex-level fitting modifying the geometry information of the 3D model and determining the color information for the 3D model using an object parsing mask, the object parsing mask defining one or more regions of the 3D model for color adjustment.

In some aspects, performing the at least one vertex-level fitting of the 3D model includes performing a joint optimization of the geometry information and the color information.

In some aspects, performing the at least one vertex-level fitting of the 3D model includes: identifying the one or more regions defined by the object parsing mask; performing a first vertex-level fitting of the 3D model to the object, the first vertex-level fitting modifying the geometry information of the 3D model by shifting each vertex of the 3D model to fit the object in the image, the first vertex-level fitting further determining the color information for each vertex of the 3D model; and performing a second vertex-level fitting of the 3D model to the object, the second vertex-level fitting adjusting the color information for each vertex of the 3D model included in the one or more regions identified by the object parsing mask.

In some aspects, determining the color information for each vertex of the 3D model includes: determining, using a clustering algorithm, a plurality of candidate colors for each vertex of the 3D model included in the one or more regions identified by the object parsing mask; and selecting, for each vertex included in the one or more regions identified by the object parsing mask, a brightest color from the plurality of candidate colors determined for each vertex.

In some aspects, the clustering algorithm includes a K-means algorithm.

In some aspects, generating the refined 3D model of the object includes: performing a pixel-level refinement of the fitted 3D model, the pixel-level refinement adding the depth information to a portion of the fitted 3D model.

In some aspects, the method, apparatuses, and computer-readable medium described above further comprise: determining, using a refinement mask, the portion of the fitted 3D model for adding the depth information using the pixel-level refinement.

In some aspects, the object includes a face, and wherein the refinement mask includes an eye mask indicating that the portion includes a region of the face outside of eye regions of the face.

In some aspects, performing the pixel-level refinement of the fitted 3D model includes: generating an albedo image and a depth image for the fitted 3D model; and generating the refined 3D model using the albedo image and the depth image.

In some aspects, the method, apparatuses, and computer-readable medium described above further comprise: applying a smoothing function to the fitted 3D model.

In some aspects, the smoothing function includes a Discrete Laplacian Smoothing function.

In some aspects, the object is a face.

In some aspects, the method, apparatuses, and computer-readable medium described above further comprise: outputting the refined 3D model of the object.

In some aspects, the apparatus is or is part of a camera (e.g., an IP camera), a mobile device (e.g., a mobile telephone or so-called "smartphone," or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 11 is a flow diagram illustrating an example of a process for generating one or more three-dimensional (3D) models, in accordance with some examples.

DETAILED DESCRIPTION

Figure 1:
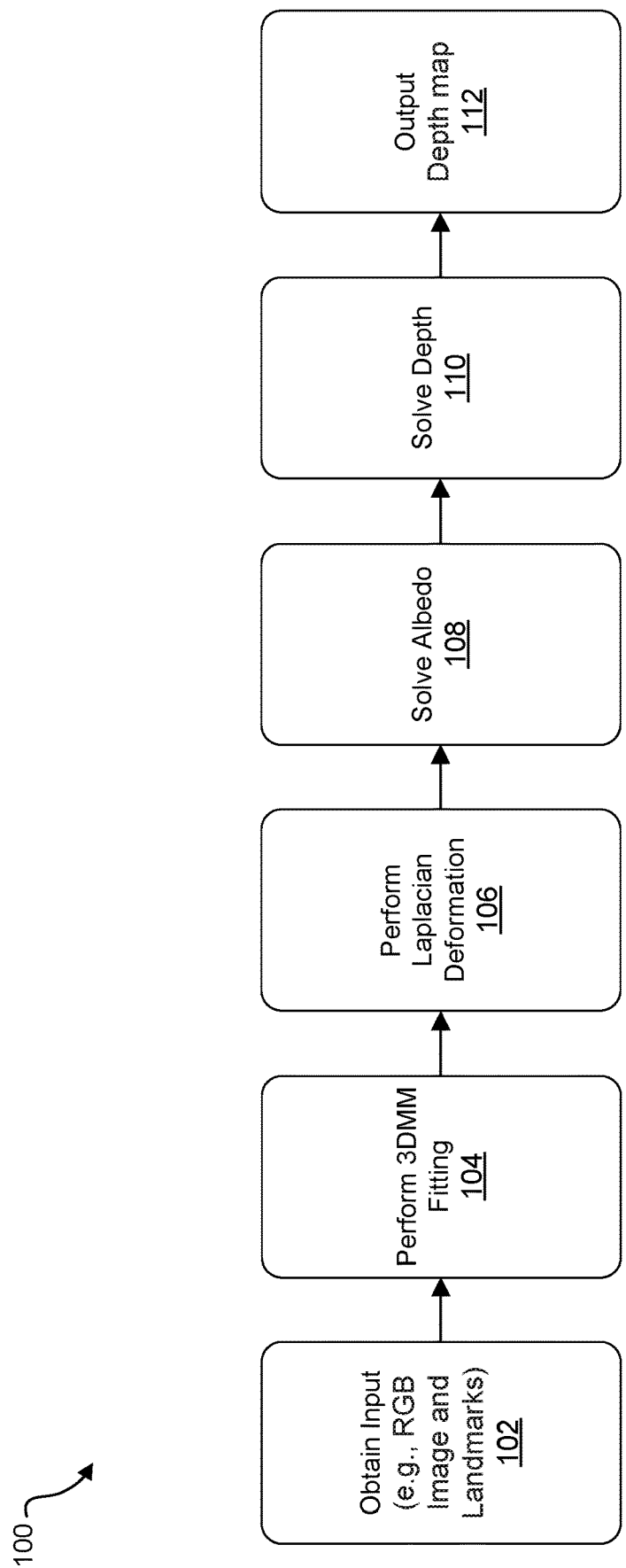
FIG. 1 is a diagram illustrating an example of a process for performing object reconstruction based on a three-dimensional morphable model (3DMM) technique, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The generation of three-dimensional (3D) models and/or depth maps for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images that include an integration of artificial or virtual graphics with the user's natural surroundings. AR applications allow real images to be processed to add virtual objects to the images and to align or register the virtual objects to the images in multiple dimensions. For instance, a real-world object that exists in reality can be represented using a model that resembles or is an exact match of the real-world object. In one example, a model of a virtual airplane representing a real airplane sitting on a runway may be presented in the view of an AR device (e.g., AR glasses, AR head-mounted display (HMD), or other device) while the user continues to view his or her natural surroundings in the AR environment. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

Generating a detailed three-dimensional (3D) model of an object (e.g., a 3D face model) typically requires expensive equipment, which hinders large-scale data collection processes. A face is an example of an object for which a 3D model can be generated. There is an increasing number for face related applications (e.g., for XR systems, for 3D graphics, for security, among others), leading to a large demand for systems with the ability to generate detailed 3D face models (as well as 3D models of other objects) in an efficient and high-quality manner. There also exists a large demand for generating 3D models of other types of objects, such as 3D models of vehicles (e.g., for autonomous driving systems), 3D models of room layouts (e.g., for XR applications, for navigation by devices, robots, etc.), among others.

Performing three-dimensional (3D) object reconstruction (e.g., to generate a 3D model and/or depth information of an object, such as a face) from one or more images (e.g., a single RGB image) can be challenging. For example, the difficulty can arise based on the 3D object reconstruction involving geometry shape, albedo texture, and illumination estimation. Albedo texture refers to image texture (e.g., color) without any shadows or highlights. One way to perform single image 3D face reconstruction is based on a 3D morphable model (3DMM) fitting, described in Volker Blanz and Thomas Vetter, "A morphable model for the synthesis of 3D faces," Siggraph. Vol. 99. No. 1999, 1999, which is hereby incorporated by reference in its entirety and for all purposes. A 3DMM model generated using a 3DMM fitting is a statistical model of 3D facial geometry and texture. A 3D face model can be represented by a linear combination of basis terms with coefficients for shape $X_{shape}$, expression $X_{expression}$, and texture $X_{albedo}$, for example as follows:

$$\text{Vertices}_{3D\_coordinate} = X_{shape} \text{Basis}_{shape} + X_{expression} \text{Basis}_{expression} \quad (1)$$

$$\text{Vertices}_{color} = \text{Color}_{mean\_albedo} + X_{albedo} \text{Basis}_{albedo} \quad (2)$$

Equation (1) is used to determine the position of each vertex of the 3DMM model, and Equation (2) is used to determine the color for each vertex of the 3DMM model.

FIG. 1 is a diagram illustrating an example of a process 100 for performing object reconstruction based on the 3DMM technique. At operation 102, the process 100 includes obtaining an input, including an image (e.g., an RGB image) and landmarks (e.g., facial landmarks). At operation 104, the process 100 performs the 3DMM fitting technique to generate a 3DMM model. The 3DMM fitting includes solving for the shape (e.g., $X_{shape}$), expression (e.g., $X_{expression}$), and albedo (e.g., $X_{albedo}$) coefficients of the 3DMM model of the object (e.g., the face). The fitting can also include solving for the camera matrix and spherical harmonic lighting coefficients.

At operation 106, the process 100 includes performing a Laplacian deformation to the 3DMM model. For example, the Laplacian deformation can be applied on the vertices of the 3DMM model to improve landmark fitting. At operation 108, the process 100 includes solving for albedo. For example, the process 100 can fine-tune albedo coefficients to split out colors not belonging to a spherical harmonic lighting model. At operation 110, the process 100 solves for depth. For example, the process 100 can determine per-pixel depth displacements based on a shape-from-shading formulation. The shape-from-shading formulation defines a color for each point of the 3DMM model as a multiplication of the albedo color multiplied by a light coefficient. For instance, the color seen in an image is formulated as the albedo color multiplied by the light coefficient. The light coefficient for a given point is based on the surface normal of the point. At operation 112, the process 100 includes outputting a depth map and/or a 3D model.

However, the quality of 3D face reconstruction based on performing the 3DMM fitting can be limited by the complexity of the 3DMM fitting itself. For example, the 3DMM is a pre-defined model with a large data set that is used to generate the output (e.g., the depth map and/or 3D model). Based on the complexity, the reconstructed object (e.g., face) will not have a large amount of detail (e.g., the resulting depth map will not be highly detailed). Furthermore, due to its statistical nature, the texture basis of the 3DMM model comes with illumination (e.g., glossy spots or spotlights, shadows, etc.). Such illumination causes estimation of the illumination of the object to be incorrect, and is also a hindrance in recovering the detailed geometry correctly.

Systems, apparatuses, processes (or methods), and computer-readable media (collectively referred to as "systems and techniques") are described herein that can perform a 3D object reconstruction (e.g., a 3D model of a face or other object) from a single image (e.g., an RGB image), or from multiple images in some cases, to produce a 3D model and/or a depth map. For example, in some cases, a 3D model can be generated (which includes depth information) using the systems and techniques described herein. In another example, a depth map can be generated using the systems and techniques described herein.

In some examples, as described in more detail below, the systems and techniques can perform an initial fitting (e.g., a 3D morphable model (3DMM) fitting) based on an image (e.g., a single image). The systems and techniques can perform one or more vertex-level fitting processes based on the initial fitting (e.g., the 3DMM fitting) and an object parsing mask. In some examples, the object parsing mask can include a facial parsing mask. In some cases, the object parsing mask can indicate one or more regions of the object for applying a clustering algorithm and/or for color adjustment. The systems and techniques can also perform a pixel-level refinement (e.g., after performing the one or more vertex-level fitting processes) to generate a refined 3D model. In some cases, a refinement mask can be used to determine a portion of the 3D model for adding depth information using the pixel-level refinement.

The texture resulting from the initial (e.g., 3DMM) fitting can include preliminary gloss and shadows due to its statistical properties, leading to incorrect light estimation results. In some examples, the systems and techniques described herein can apply a clustering algorithm (e.g., a K-means algorithm) to each vertex color belonging to a non-textured region of the object (e.g., identified by the object parsing mask), such as a forehead, a cheek, a nose, and/or other region of a face. The brightest center can be selected as the base albedo color for the 3D model, providing a texture without gloss and shadows and resulting in more accurate light estimation.

The systems and techniques can integrate semantic object (e.g., facial) parsing into detailed 3D object reconstruction (e.g., 3D face or other object reconstruction). The object parsing mask noted above can provide the semantic parsing of the object. The systems and techniques are able to synthesize albedo texture on-the-fly during the 3DMM fitting so that the albedo texture does not only produce a gloss-and-shadow free texture, but also leads to accurate lighting estimation. The solution can reconstruct a detailed 3D object (e.g., a 3D face) with a light-weight initial (e.g., 3DMM) fitting, while keeping superior quality with respect to both subjective and objective quality measures.

Among other benefits, the techniques and systems described herein can solve the deficiency of the 3DMM fitting technique (e.g., the deficiency associated with the basis terms, complexity, etc.). For example, the techniques and systems can conduct a free-form 3D shift (e.g., under a Laplacian deformation constraint) to enable non-rigid deformations to have a better fitting capability beyond shape and expression coefficients, while preserving the major surface shape of the object (e.g., the face). The techniques and systems can also implement a novel algorithm to extract albedo texture from the reference image (e.g., the input RGB image) directly with the guidance of the object parsing mask (e.g., indicating regions of the image from which to extract the albedo texture from the image), such as a facial parsing mask. Furthermore, with the guidance of a refinement mask, unexpected depth results can be avoided in non-homogeneous areas (e.g., the eyes of a face to keep the realistic ball-like shape of the eyes).

Faces will be used herein as an example of an object for illustrative purposes. However, one of ordinary skill will appreciate that the systems and techniques described herein can be performed for any type of object captured in one or more images.

Figure 2A:
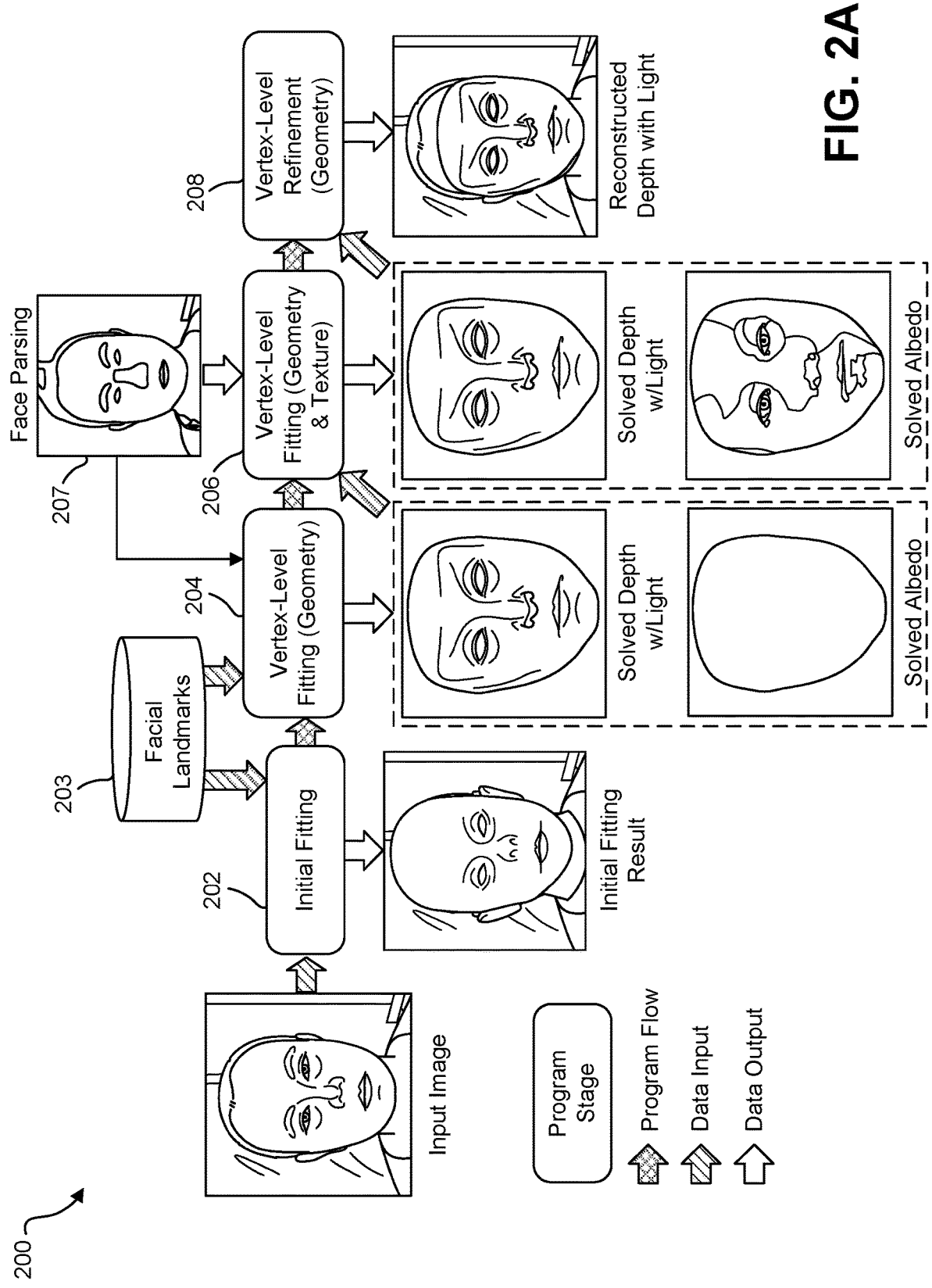
FIG. 2A is a diagram illustrating an example of a process for performing object reconstruction with texture parsing, in accordance with some examples.

FIG. 2A is a diagram illustrating an example of a system 200 pipeline that can perform detailed 3D face reconstruction from a single RGB image. As shown in FIG. 2A, the proposed pipeline includes three different stages, including an initial fitting stage 202 (which can include a 3DMM fitting), a vertex-level fitting stage (e.g., including vertex-level fitting process 204 and vertex-level fitting process 206), and pixel-level refinement stage 208 (also referred to as pixel-level fitting). For the initial fitting (e.g., the 3DMM fitting), a landmark-based method can be applied (using facial landmarks 203), but without color-related terms. One example of a landmark-based method that can be used is described in Yudong Guo, et al., "Cnn-based real-time dense face reconstruction with inverse-rendered photo-realistic face images," IEEE transactions on pattern analysis and machine intelligence 41.6 (2018): 1294-1307, which is hereby incorporated by reference in its entirety and for all purposes. In some cases, the system 200 can solve for a camera weak perspective matrix and coefficients of shape and expression.

In some examples, as shown in FIG. 2A, the vertex-level fitting stage includes a first vertex-level fitting process 204 and a second vertex-level fitting process 206 that can be sequentially applied. For instance, the first vertex-level fitting process 204 can include a geometry-only fitting and the second vertex-level fitting process 206 can include a combined geometry and texture fitting. Sequentially applying the first and second vertex-level fitting processes 204, 206 can provide a better convergence of the loss function(s) described below. In some examples, the vertex level fitting can include extracting the skin color of a face in the image by applying a clustering algorithm, such as a K-means algorithm, on skin areas defined by a facial parsing mask 207. In some cases, light coefficients of a spherical harmonic (SH) is solved using a least-square solution. An example of a least-square solution is described in Ira Kemelmacher-Shlizerman and Ronen Basri, "3D face reconstruction from a single image using a single reference face shape," IEEE transactions on pattern analysis and machine intelligence 33.2 (2010): 394-405, which is hereby incorporated by reference in its entirety and for all purposes. The process can then optimize shape, expression, and the light coefficients based on a loss (e.g., a photorealism loss, such as that shown in equation (9) below) with free-form shift of vertices (e.g., see equation (3) below) during the geometry-only vertex-fitting process 204. A facial parsing mask 207 for rich textured regions can be used for the first vertex-level fitting process 204 and/or the second vertex-level fitting process 206. For instance, an additional color adjustment term (e.g., see equation (11) below) can be added into the loss function to generate the albedo texture during the second vertex-level fitting process 206. As shown in the equations below, the vertex-level fitting processes 204 and 206 jointly optimize the shape and albedo of the 3D model.

In the pixel-level refinement stage 208, the system 200 can render a coarse depth map and can solve for a depth displacement for each pixel based on shape-from-shading loss (e.g., see equation (17) below) or other loss with illumination and texture estimated. This step is based on the albedo texture (e.g., the light coefficient) and the 3D model or mesh solved in the vertex-level fitting stage.

Figure 4B:
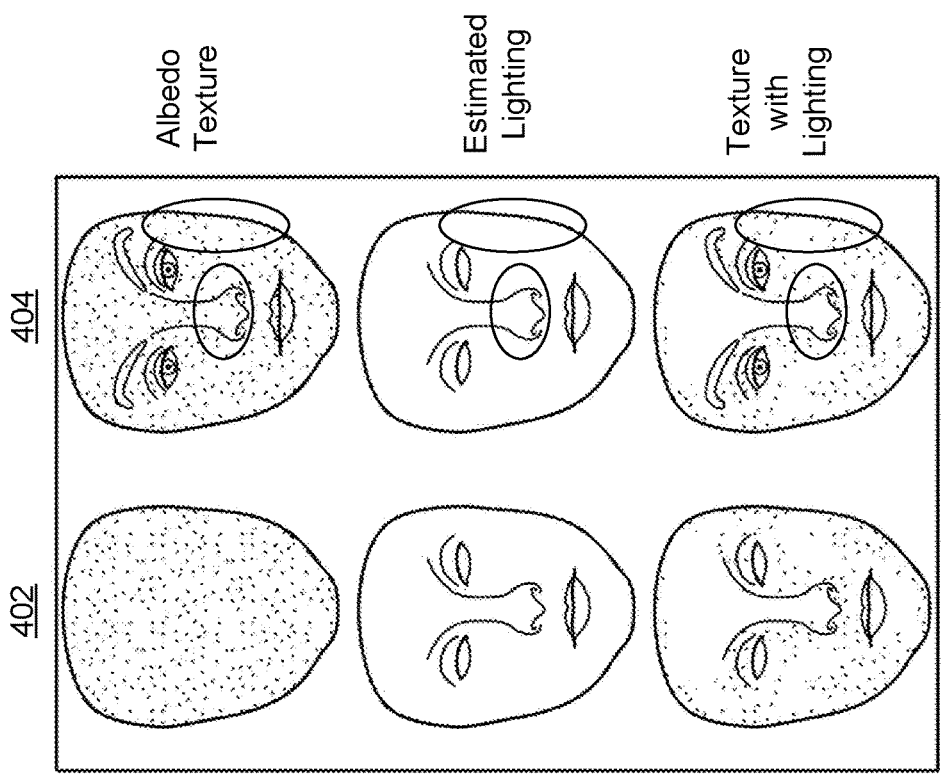
FIG. 4B is a diagram illustrating examples of reconstructed faces illustrating light estimated by skin color extraction and light estimated by mean albedo texture (with incorrect light caused by built-in shadows marked by circles), in accordance with some examples.
Figure 4A:
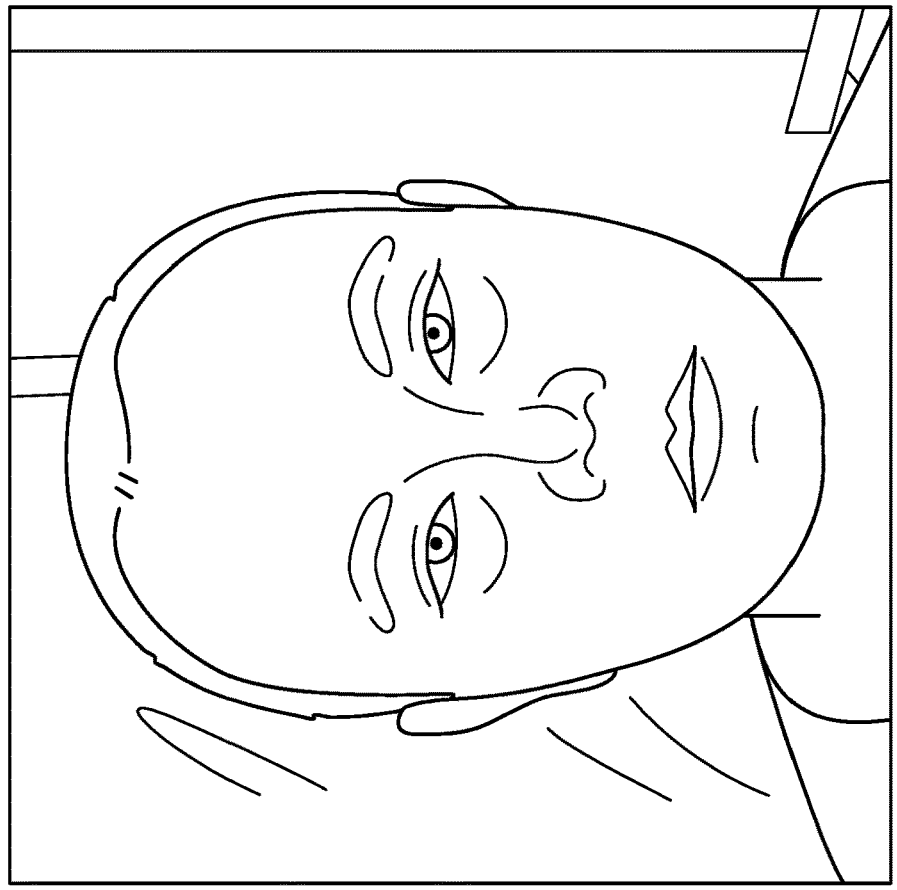
FIG. 4A is an example of an input image, in accordance with some examples.

The object parsing mask (e.g., the facial parsing mask 207) can be applied in different stages to improve the reconstruction result. In some examples, the object parsing mask can be used for skin color extraction during the vertex-level fitting stage (e.g., during the first vertex-level fitting process 204). For instance, the skin color resulting from the initial fitting (e.g., the 3DMM-based fitting) is determined by the linear combination of its mean texture and basis, as shown in equation (2) above. However, the texture resulting from the initial (e.g., 3DMM) fitting typically contains preliminary gloss and shadows due to the statistical properties of 3DMM. FIG. 4A is an example of an input image and FIG. 4B provides a comparison of light estimated based on skin color extraction (shown in the top row of column 402) and light estimated based on mean albedo (shown in the top row of column 404). Results of light estimated by skin color extraction are shown in column 402 and results of light estimated by mean albedo texture are shown in column 404. Incorrect light estimation results caused by the built-in shadows and gloss is marked in FIG. 4B by circles. For example, as shown in column 404 of FIG.

4B, preliminary gloss and shadows results in an incorrect light estimation result based on the input image shown in FIG. 4A.

Figure 3:
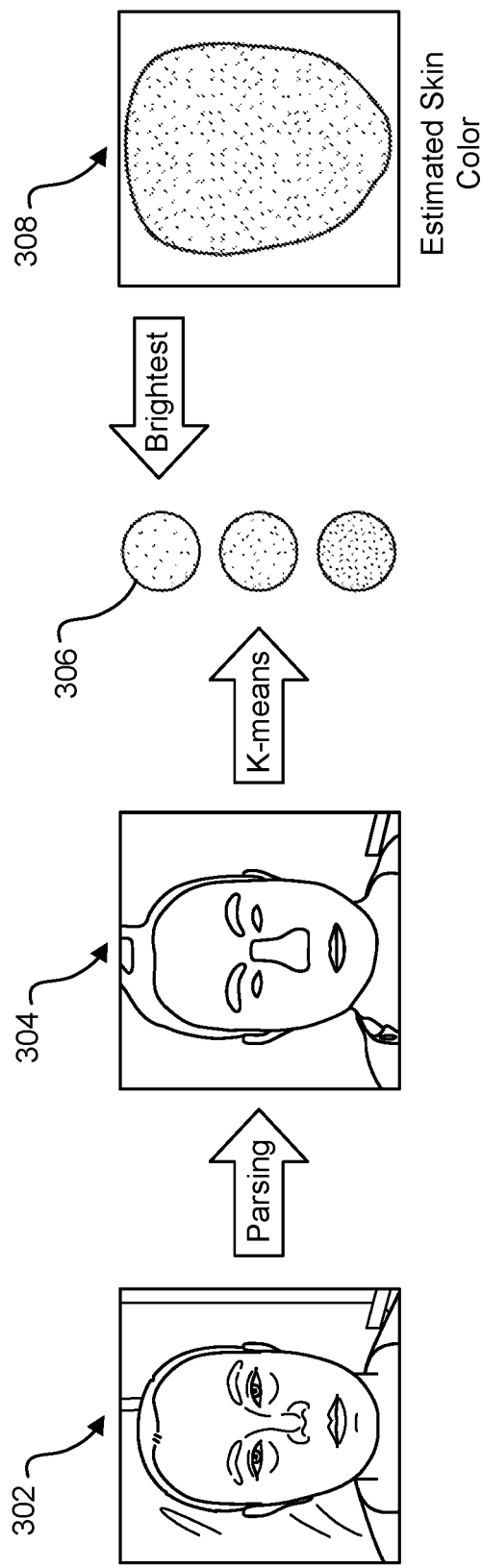
FIG. 3 is a block diagram illustrating an example of a process for skin color extraction, in accordance with some examples.

As illustrated in FIG. 3, the systems and techniques described herein can apply a clustering algorithm (e.g., K-means or other clustering algorithm) to each vertex color (referred to as candidate colors) belonging to non-textured regions of an input image 302 identified by the facial parsing mask 207, such as forehead, cheek, and nose regions of a face in an image. The facial parsing mask is illustrated by image 304. As further illustrated in FIG. 3, the brightest color 306 is selected as the base albedo color (e.g., the brightest color 306 is selected from the candidate colors). The albedo color is denoted as $C_{albedo}$ below. Such a technique leads to a texture without gloss and shadows, providing a more accurate light estimation as shown in column 402 of FIG. 4. The estimated skin color based on the selected brightest color 306 is illustrated in image 308.

Figure 5:
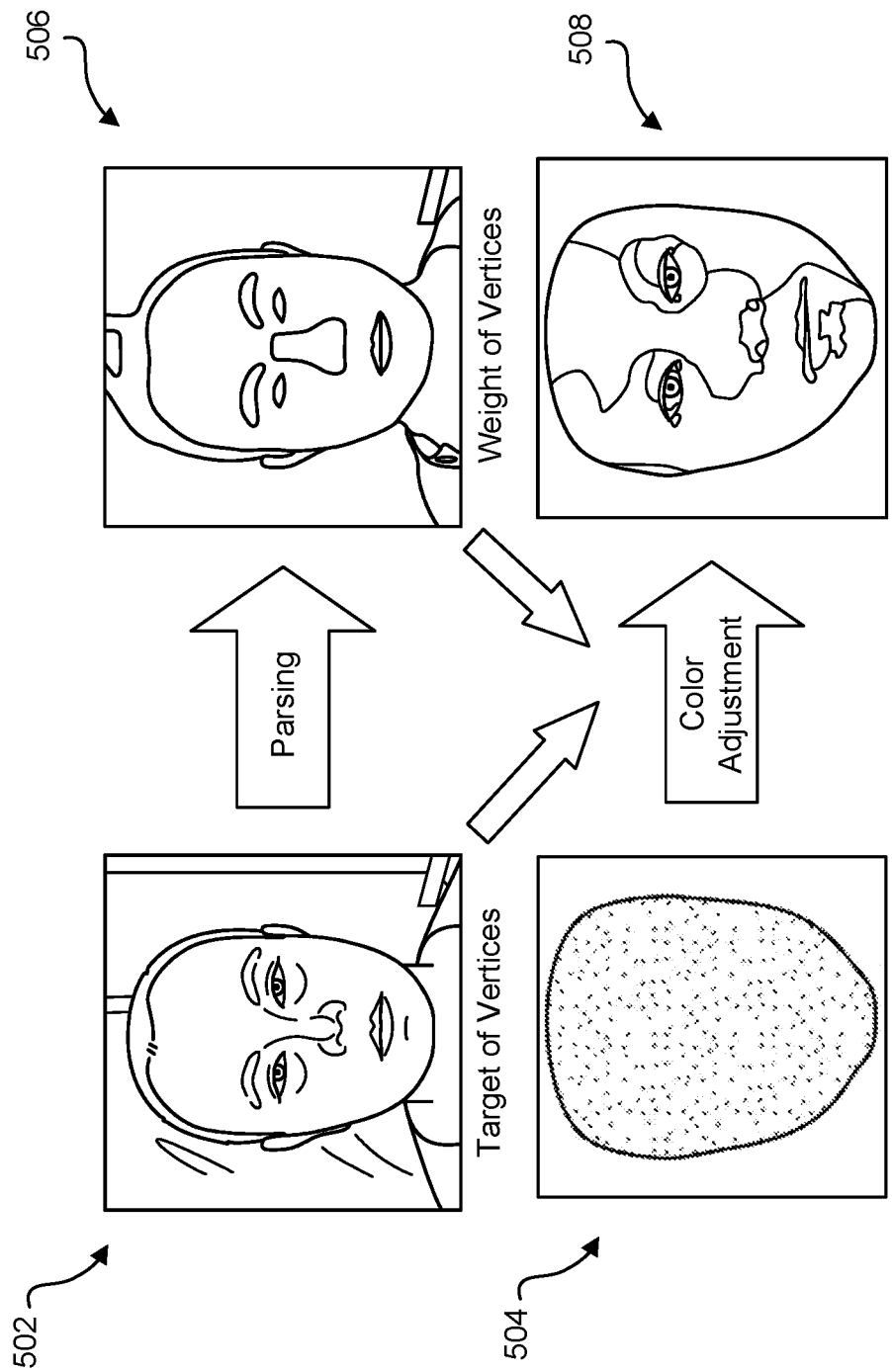
FIG. 5 is a block diagram illustrating an example of a process for color adjustment with a facial parsing mask (as an example of an object parsing mask), in accordance with some examples.

In some examples, the object parsing mask (e.g., the facial parsing mask 207) can also be used for performing color adjustment during the vertex-level fitting stage (e.g., during the second vertex-level fitting process 206). FIG. 5 is a diagram illustrating an example process for performing color adjustment using the facial parsing mask 207. Given an input image 502, an initial skin color is determined (illustrated in the albedo image 504 showing the albedo color of the face). The facial parsing mask is illustrated in image 506 and is used to determine which regions are rich textured region(s), such as the eyebrows, the mouth, the lips, and the eyes. For example, as described in more below, a color adjustment term is added to a fitting loss function (an example the fitting loss function is shown as equation (11) below) to further synthesize those regions with rich texture information, such as the eyebrows and mouth of a face. The color adjustment term can include both a texture part and an inhomogeneous part, such as specular reflection and shadow by occlusion, which is out of the scope of the spherical harmonic lighting model. During the optimization process, the process forces the color adjustment of the vertices in the rich textured region(s) to be close the corresponding color in the reference or input image with weight(s) higher than vertices in other regions (e.g., as shown in equations (15) and (16)). As noted above, the shape-from-shading formulation indicates that the color of each pixel in the input image 502 should be some scalar multiplied by the albedo color. However, the color change in the rich textured region(s) (e.g., eyebrows, mouth, lips, eyes, among others) may not be due to the normal lighting of the surface, but may actually be from the albedo directly (e.g., from the input image). For instance, the reason the lips are red is because the lips are actually red, not because of the light or the geometry of the face. When generating albedo for a face in an image, the systems and techniques described herein can use the facial parsing mask to determine how to process different regions (e.g., how to process rich textured regions versus how to process non-textured regions). For example, the facial parsing mask can indicate which pixels belong to the regions (e.g., non-textured regions) that are going to be processed by the shape-from-shading function and which pixels belong to the regions (the rich textured regions) that will not be processed (or will be processed differently than the non-textured regions) by the shape-from-shading function. The image 508 illustrates the result of the shape-from-shading function (e.g., resulting after the second vertex-level fitting process 206).

Figure 6:
FIG. 6 is an image illustrating an example of a face reconstruction result performed using face reconstruction with texture parsing, in accordance with some examples.

As noted above, a refinement mask can be used in some cases. For example, because the eyes of humans (among other animals) are reflective, performing per-pixel depth refinement under a spherical harmonic lighting model can result in unnatural geometry. To overcome such an issue, the depth refinement performed during the pixel-level refinement stage 208 can be performed using an eye refinement mask. For instance, the eye refinement mask can define the position of the eyes so that the pixel-level refinement stage 208 adds depth to a portion of the face outside of the regions of the model corresponding to the eyes (and thus does not adjust the depth of the points corresponding to the eyes) and does not add to or modify the depth of the eye regions. In some examples, the eye refinement mask can be used for the eyes after the vertex-level fitting stage is performed and can limit the depth displacement of pixels of the eye regions defined in the eye refinement mask, such as by using an additional loss function (e.g., see equation (18) below). Use of the eye refinement mask allows the system 200 to output a 3D model and/or depth map with eye regions having a ball-like shape, resulting in an output with a visual appearance that more realistically models the shape of the physical eyes of the person. FIG. 6 is an image illustrating an example of a face reconstruction result performed using an eye refinement mask, where the eye regions (shown in box 602) have a ball-like shape with a smooth surface. If the depth of the eye regions were adjusted during the pixel-level refinement stage 208, the eye regions would have a bumpy texture.

Figure 2B:
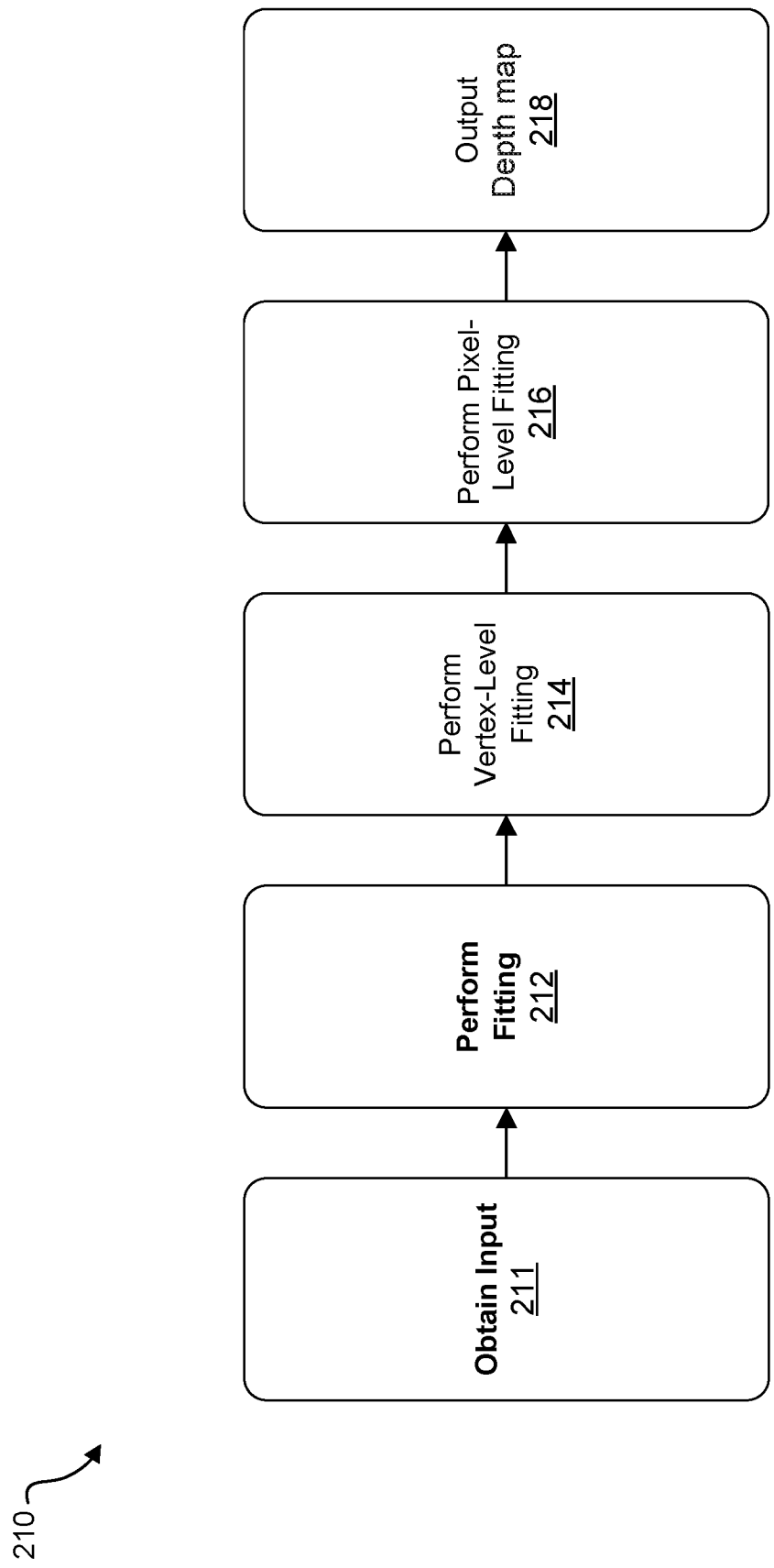
FIG. 2B is a diagram illustrating another example of a process for performing object reconstruction with texture parsing, in accordance with some examples.

FIG. 2B is a diagram illustrating another example of the pipeline or process 210 for performing the 3D face reconstruction (e.g., from a single RGB image). For example, at operation 211, the process 210 receives an input image (e.g., an RGB image), landmarks (e.g., the facial landmarks 203 shown in FIG. 2A), and a facial parsing mask (e.g., the facial parsing mask 207 shown in FIG. 2A). At operation 212, the process 210 performs an initial fitting, which can include a 3DMM fitting. The initial fitting can generate a 3D model of a face in an image. The initial fitting can include solving shape and expression coefficients of the 3DMM model (e.g., using equations (1) and (2) above), solving for or obtaining a camera matrix (e.g., $X_{cam}$, below). The initial fitting can also include solving for spherical harmonic lighting coefficients. The camera matrix can be solved for using any suitable transform algorithm, which can perform a transformation from the 2D image domain to the 3D domain.

At operation 214, the process 210 performs a vertex-level fitting to extract skin color and to jointly solve for vertex shifts, for color adjustment, for shape, for expression coefficients of the 3D model determined at operation 212 (e.g., the 3DMM model), and for lighting coefficients. As noted above, the vertex-level fitting can include the first vertex-level fitting process 204 and the second vertex-level fitting process 206. Further details of the vertex-level fitting are described below.

At operation 216, the process 210 performs a pixel-level refinement (or fitting) to solve per-pixel depth displacements, which can be performed based on the shape-from-shading formulation, as described below (e.g., see equation (17) below). At operation 218, the process 210 outputs a depth map and/or a 3D model including depth information. For example, the 3D model can include a 3D mesh made up of a collection of vertices or points connected by edges and faces. The mesh can model an object (e.g., a face) by assigning (x, y, z) spatial coordinates for each of the vertices, with the x-coordinate corresponding to a horizontal dimension, the y-coordinate corresponding to a vertical dimension, and the x-coordinate corresponding to a depth dimension. The mesh can include a volumetric mesh or a polygon mesh.

Implementation details regarding the operations performed by the system 200 and the process 210 are now described with respect to facial reconstruction. The initial fitting (e.g., the 3DMM fitting) can be performed using a number of landmarks. For instance, facial landmarks determined for a face in an input image (e.g., an RGB image) can be used to fit a generic 3D model to the face geometry in the input image. The fitting can include modifying the vertices of the 3D model based on the facial landmarks (e.g., modifying one or more vertices on the nose of the model to align or closely align with one or more landmarks on the nose of the face in the image) so that the geometry of the 3D model more closely matches the face in the image. The initial fitting will provide a rough estimation of a depth map and/or 3D model of the face. The vertex-level processes 204 and 206 and the pixel-level refinement stage 208 described herein can provide a more detailed and refined depth map and/or 3D model.

Figure 7A:
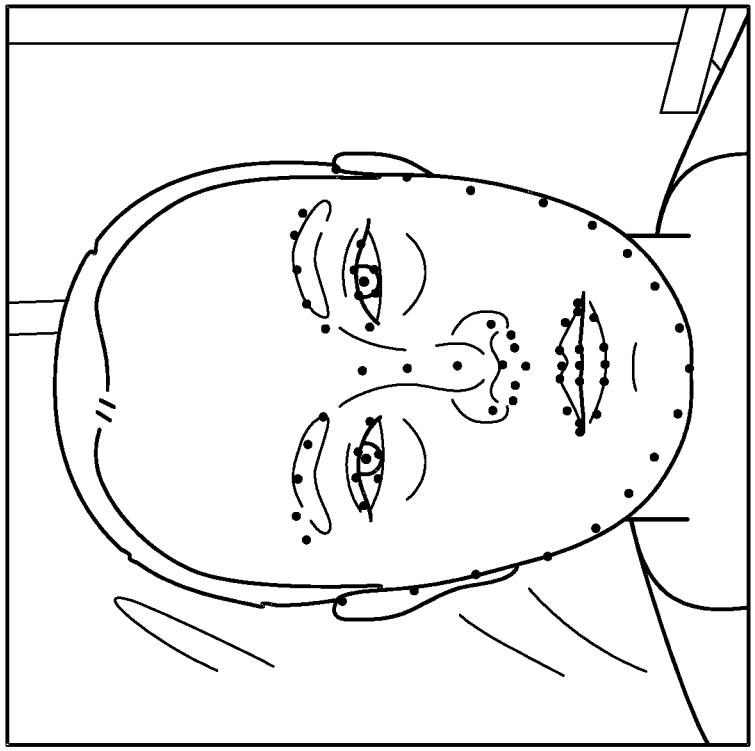
FIG. 7A is an image illustrating an example of face landmarks based on iBug, in accordance with some examples.
Figure 7B:
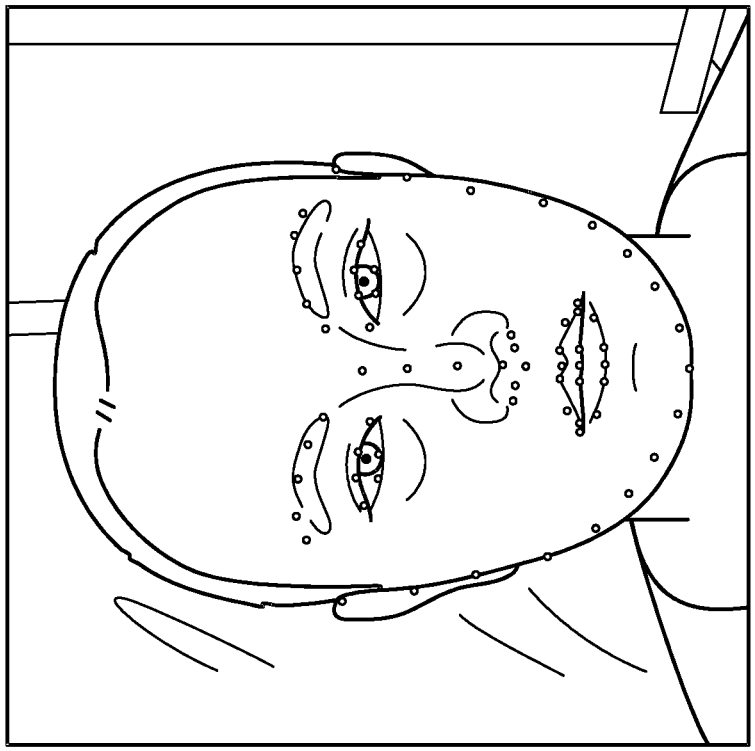
FIG. 7B is an image illustrating an example of face landmarks based on the techniques described herein, in accordance with some examples.

In one illustrative example, 68 facial landmarks can be used for the initial fitting, such as the facial landmarks shown in FIG. 7A. The 68 landmarks can include those defined by iBug in https://ibug.doc.ic.ac.uk/resources/300-W/, which is hereby incorporated by reference in its entirety and for all purposes. For the vertex-level fitting, a different set of facial landmarks can be used. In one illustrative example, 70 landmarks can be used for the vertex-level fitting, such as the facial landmarks shown in FIG. 7B. In some cases, as shown in FIG. 7B, the landmarks for the eyebrows are defined along the lower boundary of the eyebrows, and two landmarks for the nose are also added (as compared to the landmarks shown in FIG. 7A) for providing a better nose shape. In some examples, an Adam optimizer from Pytorch can be used to solve all the optimization problems described herein. The Adam optimizer and Pytorch are described in Adam Paszke, et al., "Automatic differentiation in pytorch," (2017), which is hereby incorporated by reference in its entirety and for all purposes. In the below equations, the boundary constraint terms for spherical harmonics (SH) and the 3DMM coefficients are left out for better legibility.

As described below, the vertex-level fitting processes 204 and 206 can optimize the light, geometry, and albedo jointly. For example, the initial lighting can be obtained from the initial fitting (e.g., the 3DMM fitting). The vertex-level fitting processes 204 and 206 can optimize the light according to the geometry and the albedo. Many existing systems optimize shape (or geometry), light, and albedo separately. The systems and techniques described herein can provide an improved depth map and/or 3D model result by jointly optimizing the light, geometry, and albedo using the techniques described below (e.g., illustrated in equations (9), (11), etc.).

An example implementation of the first vertex-level fitting process 204 (e.g., with respect to geometry only) will now be described. In this stage, the system 200 can conduct a per-vertex shift $X_{shift}$ (e.g., resulting in modifying the geometry information of the initial model, such as the 3DMM model) to ensure that a better fitting is obtained as compared to the fitting obtained using only the initial fitting (e.g., the initial 3DMM fitting). The per-vertex shift $X_{shift}$ can result in each vertex being shifted non-linearly. In one example, given a camera matrix $X_{cam}$ and the coefficients for shape $X_{shape}$ and expression $X_{expression}$ from the initial fitting (e.g., from the 3DMM fitting), the system 200 can reconstruct the vertices coordinates $V_{3d}$ and $V_{2d}$ by projecting them to the 2D image as follows:

$$V_{3d} = X_{shape} \times Basis_{shape} + X_{expression} \times Basis_{expression} + X_{shift} \qquad (3)$$

$$V_{2d} = \text{Project}(V_{3d}, X_{cam}) \qquad (4)$$

The term $V_{3d}$ determined using equation (3) is a per-vertex 3D position of each vertex of the initial model generated as a result of the initial fitting. The term $V_{2d}$ determined using equation (4) represents each vertex position in 2D (in the image). The 3D position $V_{3d}$ can be used to compute the geometry. The 2D position $V_{2d}$ can be used to compute the color of each vertex in the image coordinate domain. The shape coefficient $X_{shape}$ and shape basis $Basis_{shape}$ (from the 3DMM) represent the position for each vertex in the initial model (e.g., the 3DMM model) and the expression coefficient $X_{expression}$ and the expression basis $Basis_{expression}$ represent a pre-defined pattern (based on a particular expression) for each vertex to move. The shape and expression coefficient and basis terms are used in the initial 3DMM fitting (as shown in equations (1) and (2))) and are linear terms, and thus cannot be used to encapsulate all of the detailed information of an object (e.g., a face). The $X_{shift}$ term is determined using the optimization below and provides non-linearity to the 3D position of each vertex by modifying each 3D vertex position $V_{3d}$. The $X_{shift}$ can be in any direction (including the horizontal or x-direction, the vertical or y-direction, and/or the depth or z-direction), in which case each vertex can be shifted in any direction based on the value of $X_{shift}$.

A Laplacian constraint term is used to keep the surface appearance consistent during optimization. An example of a Laplacian constraint term is provided in Olga Sorkine, et al., "Laplacian surface editing." Proceedings of the 2004 Eurographics/ACM SIGGRAPH symposium on Geometry processing, ACM, 2004, which is hereby incorporated by reference in its entirety and for all purposes. The system 200 can transfer each vertex to its Laplacian coordinates and can calculate the loss after $X_{shift}$ is added, for example using the following equation:

$$L_{Laplacian} = \|\text{Laplacian}(V_{3d}) - \text{Laplacian}(V_{3d} - X_{shift})\|_2 \qquad (5)$$

where $L_{Laplacian}$ is the Laplacian constraint. As shown in equation (3) above (defining $V_{3d}$), each vertex position $V_{3d}$ is modified by $X_{shift}$. As noted above, each vertex can be shifted in any direction based on the value of $X_{shift}$. The Laplacian constraint can be used to constrain the amount of shift of each vertex caused $X_{shift}$. For example, the Laplacian can define a vertex coordinate by subtracting the vertex by the mean position of the neighbor vertices neighboring the vertex, maintaining the relationship between the vertex and its neighbors. The Laplacian constraint can act as a smoothing term so that vertices of the 3D mesh (making up the 3D model) are smooth. For example, vertices making up an edge of a nose should generally define a smooth edge, and the Laplacian constraint can ensure that neighboring vertices maintain a consistent spatial relationship.

Landmarks can be used as a control point during the vertex-level fitting processes. For example, to further control the 3D geometry of a reconstructed face, the system 200 can compute the 2D distance loss of the projected vertices with respect to the corresponding landmarks $L_{static\_lmk}$. In some examples, one or more of the landmarks can include contour landmarks. A contour landmark is a landmark located at the edge of the visible face area. In some cases, contour landmarks may not have fixed corresponding vertices on the initial model (e.g., the 3DMM model). In such cases, the system 200 can determine a nearest vertex for a contour landmark, and can use the nearest vertex as a control point during fitting. For instance, for a contour landmark, the system 200 can compute the distance loss to its closet vertex to compute its loss $L_{lmk\_dynamic}$. The 2D distance losses can be formulated as follows:

$$L_{lmk\_static} = \|\text{Landmark} - \text{corresponding}(V_{2d})\|_2 \quad (6)$$

$$L_{lmk\_dynamic} = \|\text{Landmark} - \text{closet}(V_{2d})\|_2 \quad (7)$$

The static landmarks $L_{lmk\_static}$ are landmarks that have a specific correspondence between the vertex index of the initial model (e.g., the 3DMM model). For example, a landmark that corresponds to a specific vertex in the model is a static landmark. For a static landmark, equation (6) determines the distance between the landmark and the 2D position of the corresponding vertex. The dynamic landmarks $L_{lmk\_dynamic}$ are landmarks that does not have a correspondence to any of the 3DMM vertex indices of the initial model. For a dynamic landmark, equation (7) determines the distance between the landmark and the 2D position of the vertex that is closest to the landmark (e.g., as measured by a distance, such as Cosine distance, Manhattan distance, or other distance).

The system 200 can perform skin color extraction, as discussed above (e.g., using a clustering algorithm, such as K-means), to determine a pure albedo color $C_{albedo}$ for each vertex. The system 200 can then apply a least-square solution to determine an initial light coefficient $X_{light}$ for each vertex. An example of the least-square solution is described in Kemelmacher-Shlizerman, et al., "3D face reconstruction from a single image using a single reference face shape," referenced above. The system 200 can compute the illumination or light scalar $S_{light}$ for each vertex using a spherical harmonic (SH) function of the normal of each vertex as follows:

$$S_{light} SH(\text{Normal}(V_{3d}), N_{band}) \cdot X_{light} \quad (8)$$

The $S_{light}$ term is the light scalar that is multiplied by the albedo color (e.g., see equation (9) below) to determine the light for a vertex of the 3D model. The term Normal($V_{3d}$) is the surface normal of each 3D vertex $V_{3d}$. The term $N_{band}$ is the number of spherical harmonic bands. In one illustrative example, $N_{band}$ can be a value of 2. According to the spherical harmonic (SH) function, a normal value can be transferred to a feature vector (e.g., a one-dimensional (1D) feature vector), which is predefined by the spherical harmonic function. The SH function is described in C. Muller, "Spherical harmonics," In Lecture Notes in Mathematics, volume 17, 1966, which is hereby incorporated by reference in its entirety and for all purposes. The variable from equation (8) that is optimized is the light term $X_{light}$, which is a 1D vector (matching the dimensionality of the SH feature vector). For example, the light $X_{light}$ is a linear combination of the SH basis obtained from the normal.

The system 200 can solve $X_{shape}$, $X_{expression}$, $X_{light}$ and $X_{shift}$ jointly with photorealism loss $L_{photo}$, where * denotes element-wise multiplication, for example using the following formulation:

$$L_{photo\_1} = \|C_{target} - C_{albedo} * S_{light}\|_2 \quad (9)$$

Figure 8:
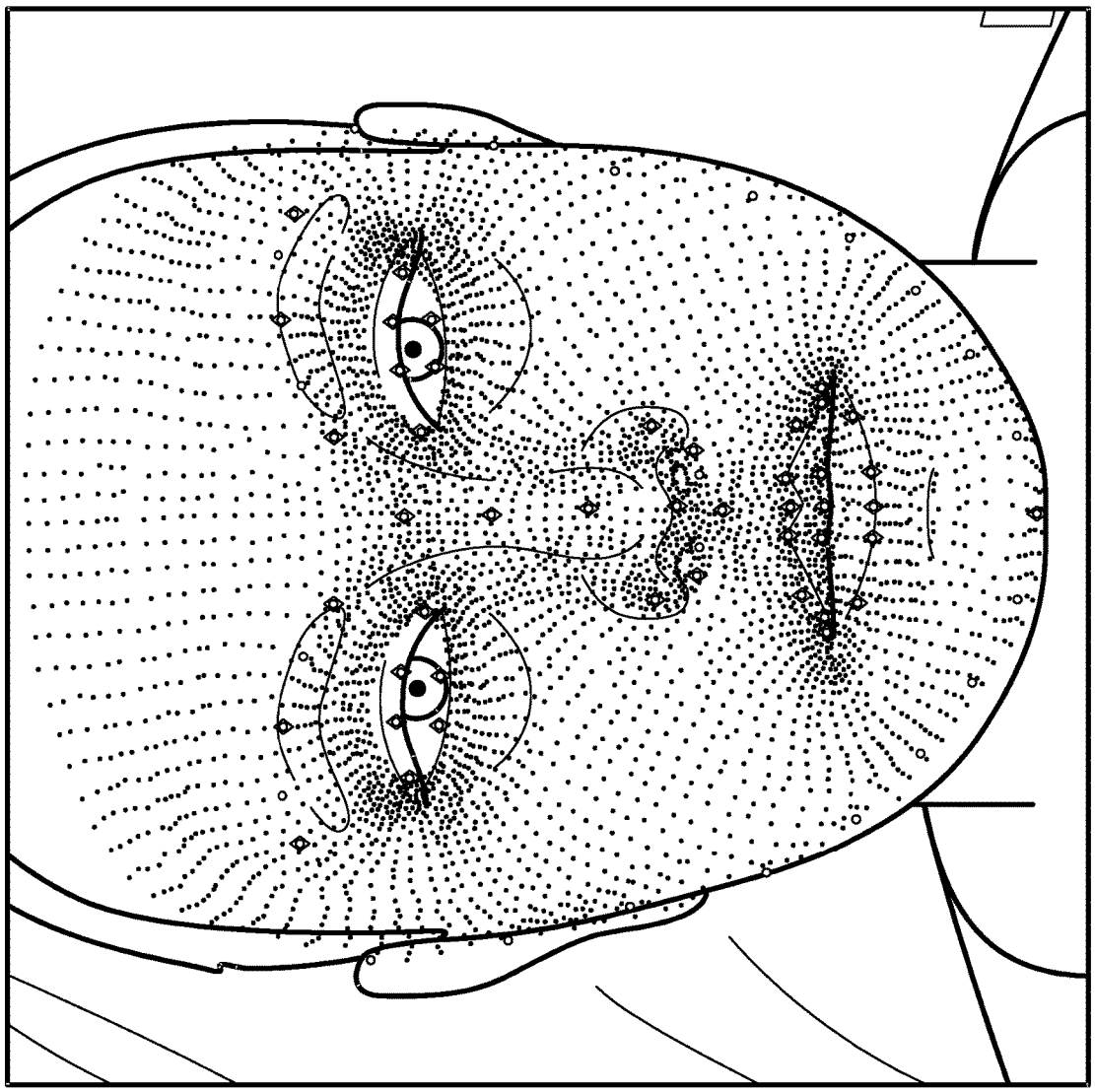
FIG. 8 is an image illustrating a visualization for landmarks and vertices projected to the image, in accordance with some examples.

The $C_{target}$ term is the target color for each vertex. The photorealism loss $L_{photo}$ of equation (9) determines the distance between the target color $C_{target}$ and the color computed based on the light scalar $S_{light}$ and the albedo color $C_{albedo}$. The target color $C_{target}$ of each vertex can be bilinearly sampled from the input image, as illustrated in FIG. 8. FIG. 8 is an image illustrating a visualization for landmarks and vertices projected to the image. In FIG. 8, the hollow circles represent landmarks, the diamonds represent vertices with corresponding landmarks defined, and the dots represent vertices. As shown, a number of vertices of the nose (around the nostril region) are clustered together. In some examples, the system 200 can ignore invisible vertices during the optimization.

An example of the overall loss function in the first vertex-level fitting process 204 with loss weights is as follows:

$$L_{vertex\_geometry} = w_{photo} L_{photo\_1} + w_{Laplacian} L_{Laplacian} + w_{lmk\_static} L_{lmk\_static} + w_{lmk\_dynamic} L_{lmk\_dynamic} \quad (10)$$

As noted above, $L_{photo\_1}$ is the color term, $L_{Laplacian}$ is the smoothing Laplacian function (for the 3D vertex positions $V_{3d}$), and $L_{lmk\_static}$ and $L_{lmk\_static}$ are the landmark-based terms (for the 2D vertex positions $V_{2d}$). The weights $w_{photo}$, $w_{Laplacian}$, $w_{lmk\_static}$, and $w_{lmk\_dynamic}$ are hyperparameters that can be tuned to specific values. An example of values used for the weighting parameters (which were used for the results described below) include $w_{photo} = 2e^6$, $w_{Laplacian} = 0.05$, $w_{lmk\_static} = 1e^5$, and $w_{lmk\_dynamic} = 1e^4$. The learning rate can be set at 0.005 and the system 200 can run 100 iterations in the first vertex-level fitting process 204.

Figure 9:
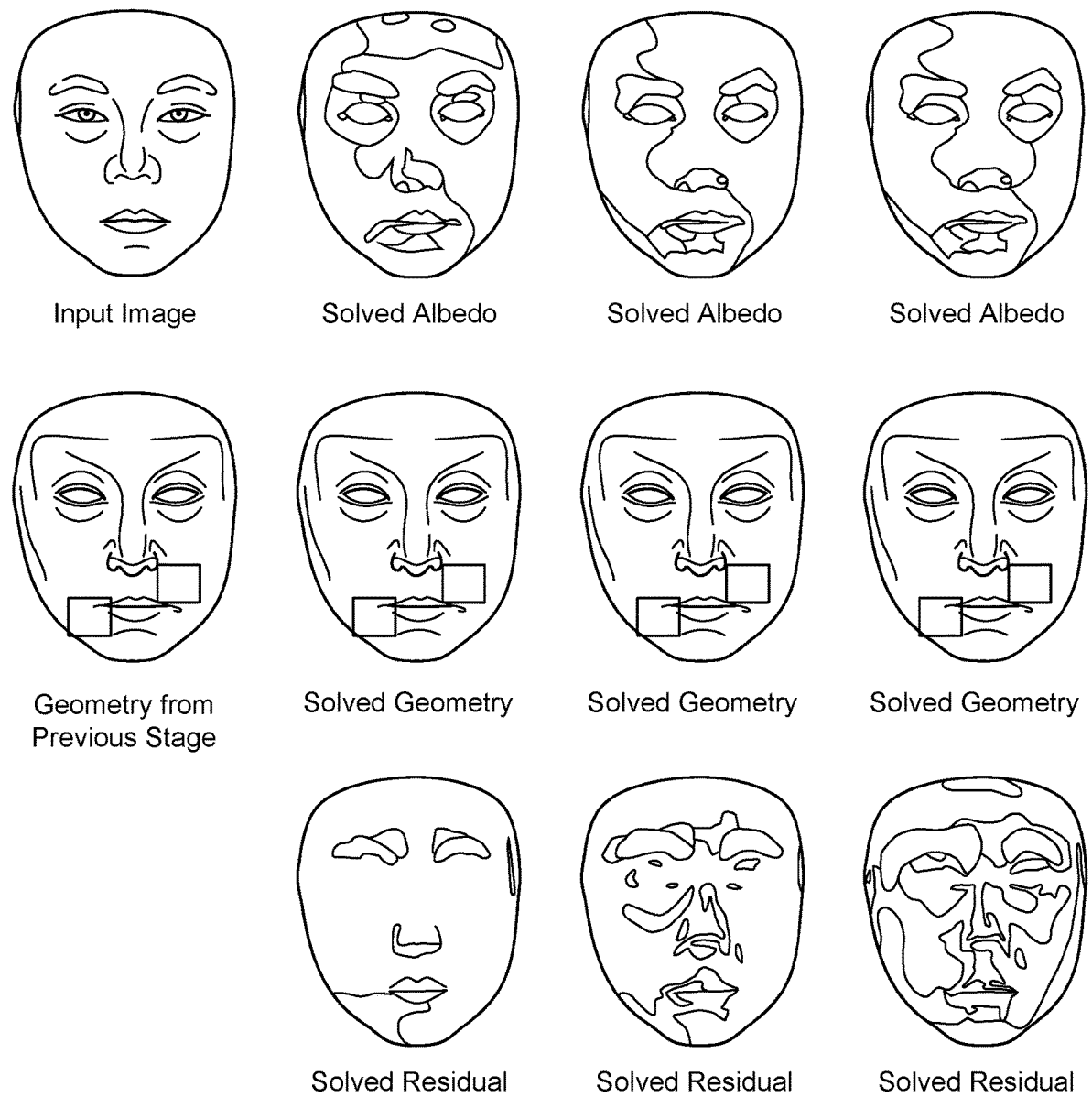
FIG. 9 includes images illustrating a comparison of color regularizations, in accordance with some examples.

An example implementation of the second vertex-level fitting process 206 (e.g., with respect to geometry and texture) will now be described. Based on the first vertex-level fitting process 204 is performed, the system 200 outputs an accurately fitted mesh (which can be referred to as a fitted 3D model) to the face in the input image. The system 200 can begin extracting albedo texture color from the reference image (the input image) using the facial parsing mask. Two color adjustment terms $C_{adjust}$ and $C_{residual}$ and their regularization terms are introduced into the optimization of the second vertex-level fitting process 206. The $C_{adjust}$ term defines a color shift for each vertex and is thus used to adjust the color for each vertex. As described above, only the $C_{albedo}$ was used in the first vertex-level fitting process 204, where the $C_{albedo}$ is the pure skin color (e.g., as shown in the image 504 of FIG. 5). The $C_{adjust}$ term can be used to adjust the $C_{albedo}$, as shown in equation (11) below. The color residual $C_{residual}$ term is used because the SH model is not able to handle some shadows caused by occlusion or spotlights. As illustrated in FIG. 9, the solved residual $C_{residual}$ focuses on not only the texture parts (e.g., the eyebrows, lips, etc.), but also on the spotlights (e.g., the nose tip).

The system 200 can solve $C_{adjust}$ and $C_{residual}$ with the other parameters jointly unlike other reconstruction techniques, which may use a step-by-step approach and/or rely on manually defined masks. For example, using the color adjustment terms $C_{adjust}$ and $C_{residual}$, the system 200 can modify the $L_{photo\_1}$ to $L_{photo\_2}$ in Equations 9 and 10 as shown below:

$$L_{photo\_2} = \|C_{target} - ((C_{albedo} + C_{adjust}) * S_{light} + C_{residual})\|_2 \quad (11)$$

As compared to equation (9), the $L_{photo\_2}$ of equation (11) adjusts the $C_{albedo}$ using $C_{adjust}$ before multiplying the albedo color by the light scalar $S_{light}$. The color adjustment may generate colors which are supposed to be formed only by actual face geometry and lighting. FIG. 9 shows images providing a comparison of color regularizations. Geometry details (e.g., as shown by the boxes in the second row FIG. 9) may e$_{presented}$ by texture directly without proper constraints. In some cases, regularization terms $R_{adjust}$ and $R_{residual}$ can be introduced to avoid over-fitting (as shown in second column of FIG. 9), which can ensure that the colors will not change by too large of an amount. The regularization terms can be defined using the following formulations:

$$R_{adjust}=\|C_{adjust}\|_2 \quad (12)$$

$$R_{residual}=\|C_{residual}\|_2 \quad (12)$$

In some examples, for the color of each vertex $C_i=C_{albedo\_i}+C_{adjust\_i}$, the system 200 can constrain the color affinity with its neighbor to prevent a complicated albedo texture from being formed (as shown in third column of FIG. 9). For example, a color affinity loss $L_{affinity}$ can be determined to ensure the albedo color that is determined is piecewise rather than a very detailed color map. The color affinity loss $L_{affinity}$ can be defined using the following formulation:

$$L_{affinity} = \sum_i^N \sum_j^K \begin{cases} 0, & \|C_i - C_j\|_2 > \tau \\ \|C_i - C_j\|_2 \times \exp\left(-\frac{\|C_i - C_j\|_2}{2\sigma^2}\right), & \text{otherwise.} \end{cases} \quad (14)$$

Where i, j, N, K are index of vertex (i), index of neighbor vertex (j), total number of vertices in the face region (N), and the number of neighbor vertices (K). The color affinity loss $L_{affinity}$ of equation (14) defines the color difference between the color $C_i$ of each vertex and the color $C_j$ of its neighboring vertex, where if the colors $C_i$ and $C_j$ of the two vertices are close enough to one another, the colors are considered the same color. Otherwise, if the colors are not close enough, the colors can be different from one another. For example, as indicated in the upper part of equation (14), if the color difference is too large (as defined by $\|C_i-C_j\|_2>\tau$), a loss is not computed. Such a situation can occur for two vertices that are on different sides of a boundary between two different colors. If the loss is within $\|C_i-C_j\|_2>\tau$, the loss is computed according to the function $$\|C_i - C_j\|_2 \times \exp\left(-\frac{\|C_i - C_j\|_2}{2\sigma^2}\right).$$

The two hyper-parameters $\tau$ and $\sigma$ can be used to control the affinity threshold.

In some examples, a loss function $L_{albedo}$ is defined to synthesize the albedo texture from the reference image, for vertices belonging to certain regions of the face defined by the facial parsing mask (e.g., the eyes, eyebrows, mouth, hair, and/or other rich textured regions on the face). The loss function $L_{albedo}$ can be defined as follows:

$$L_{albedo} = \sum_i^N \begin{cases} \left\|C_i - \left(C_{target} * \frac{1}{S_{light}}\right)\right\|_2, & \text{if } i \text{ belong to rich textured region.} \\ 0, & \text{otherwise.} \end{cases} \quad (15)$$

Figure 10:
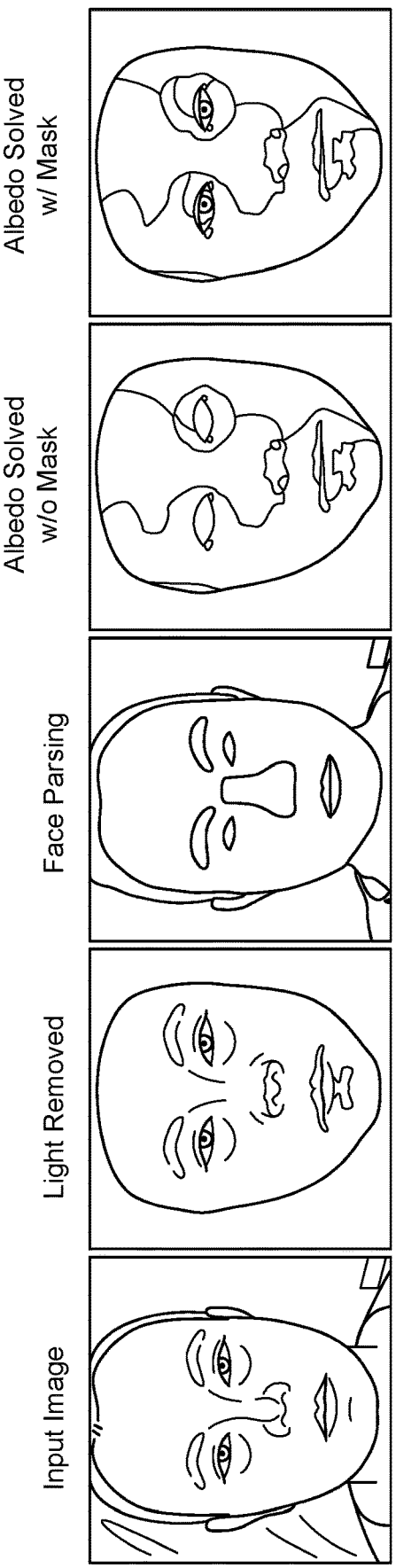
FIG. 10 includes images illustrating examples of albedo solved with and without a facial parsing mask, in accordance with some examples.

The loss function $L_{albedo}$ defined in equation (15) minimizes the difference between the generated albedo texture and the predicted color or texture, which is computed by removing the lights from reference image. As illustrated by equation (15) and equation (16) below, for textured regions (e.g., eyes, eyebrows, etc.), more weight will be applied to the color and less weight will be applied to the geometry, thus jointly optimizing the color and the geometry. For non-textured regions, the $L_{albedo}$ will be a value of 0, in which case the term will have no effect on the overall loss determined according to equation (16). The textured regions and the non-textured regions are determined using the facial parsing mask. For example, each pixel in the facial parsing mask can be assigned a first value indicating a corresponding pixel in the input image belongs to a textured region or assigned a second value indicating the corresponding pixel in the input image belongs to a non-textured region. FIG. 10 includes images illustrating examples of albedo solved with and without a facial parsing mask.

An example of the overall loss function in the second vertex-level fitting process 206 with weights and regularization terms is as follows:

$$L_{vertex-geometry-texture}=w_{photo}L_{photo\_2}+w_{Laplacian}L_{Laplacian}+w_{lmk\_static}L_{lmk\_static}+w_{lmk\_dynamic}L_{lmk\_dynamic}+W_{albedo}L_{albedo}+w_{adjust}L_{affinity}(C_{albedo}+C_{adjust})+w_{residual}L_{residual}(C_{residual})+w_{adjust\_reg}R_{adjust}+w_{redisual\_reg}R_{residual} \quad (16)$$

An example of values used for the weight parameters (which were used for the results described below) include $w_{adjust}=5e^3$, $w_{residual}=1e^3$, $w_{albedo}=1e^7$, $w_{adjust\_reg}=0.1$, and $w_{residual}=1e^5$. The learning rate can be set at 0.005 and the system 200 can run 100 iterations in the first vertex-level fitting process 204.

An example implementation of the pixel-level refinement stage 208 will now be described. In some examples, because the free-form shift may in some cases result in a rugged surface (e.g., in a low-resolution mesh), the system 200 can perform a smoothing function (e.g., a Discrete Laplacian Smoothing) on the mesh before rendering to reduce its roughness. An example of Discrete Laplacian Smoothing is described in Max Wardetzky, et al., "Discrete Laplace operators: no free lunch," Symposium on Geometry processing. 2007, which is hereby incorporated by reference in its entirety and for all purposes.

The system 200 can then render an albedo image $I_{albedo}$ and a depth image $I_{depth}$ with the smoothed mesh for pixel-level refinement. In the pixel-level refinement, the variable that needs to be solved is per-pixel displacement $D_{shift}$ in the depth or z-direction. A loss function used for the pixel-level refinement stage 208 is also photorealism loss, but at the pixel level. The system 200 can compute the normal for each pixel and can apply the solved lighting coefficient to the rendered albedo image $I_{albedo}$ during optimization. The target for the pixel-level refinement stage 208 becomes the reference image $I_{target}$ without the rendered residual part $I_{residual}$, as follows:

$$L_{photo\_3}=\|I_{target}-(I_{albedo}*(SH(\text{Normal}(I_{depth}+D_{shift}))\cdot X_{light})+I_{residual})\|_2 \quad (17)$$

Equation (17) is similar to equation (11), but considers each pixel of the image instead of each vertex of the model. The pixel-level shift $D_{shift}$ shifts the pixels in the depth or z-direction in order to make sure the depth is accurate, whereas the $X_{shift}$ can shift a vertex in any direction (including the horizontal or x-direction, the vertical or y-direction, and/or the depth or z-direction) for alignment of the 3D model to the geometry of the face in the image. To keep a ball-like eyes geometry (as shown by the result in FIG. 6), the system 200 can use the eye refinement mask to limit the pixels of the eyes to have near-zero displacement. To limit the displacement of the eye pixels (as indicated by the eye refinement mask), a region-specific penalty for each pixel p in the rendered depth image can used by the system 200, which can be formulated as follows:

$$L_{eyes} = \sum_p \begin{cases} \|D_{shift}(p)\|_2, & \text{if } p \text{ located in eyes region.} \\ 0, & \text{otherwise.} \end{cases} \quad (18)$$

Whether a pixel p belongs to the eyes region is indicated by the eye refinement mask. For example, each pixel in the eye refinement mask can be assigned a first value indicating a corresponding pixel in the input image belongs to an eye region or assigned a second value indicating the corresponding pixel in the input image belongs to a region other than an eye region.

The magnitude of discrete Laplacian operator (e.g., as described in Wardetzky, et al., "Discrete Laplace operators: no free lunch," referenced above) can be used as the loss function $L_{discrete\_Laplacian}$, which constrains the smoothness of the refined 3D model or depth map. For total magnitude of the displacement, the system 200 can use the L2 loss of $D_{shift}$ as the regularization term $R_{shift}$.

An example of the overall loss function in for the pixel-level refinement is as follows:

$$L_{pixel} = w_{photo\_3}L_{photo\_3} + w_{eyes}L_{eyes} + w_{discrete\_Laplacian} L_{discrete\_Laplacian} + w_{shift\_reg}R_{shift} \quad (19)$$

Solving equation (19) results in the value for $D_{shift}$, which can be used to determine the final depth map and/or 3D model that will be output. For example, $D_{shift}$ can be applied to shift the values of the previously-generated depth map (or image) $I_{depth}$ (shown above as $I_{depth} + D_{shift}$). An example of values used for the parameters (which were used for the results described below) include $w_{photo\_3} = 1e^3$, $w_{eyes} = 1e^9$, $w_{discrete\_Laplacian} = 1$ and $w_{shift\_reg} = 1e^{-5}$.

An evaluation of a reconstructed 3D face on the Face Recognition Grand Challenge (FRGC) dataset is provided with respect to other face reconstruction techniques, including a technique described in Yue Li, et al., "Feature-preserving detailed 3d face reconstruction from a single image," Proceedings of the 15th ACM SIGGRAPH European Conference on Visual Media Production, ACM, 2018 and a technique described in Kemelmacher-Shlizerman, et al., "3D face reconstruction from a single image using a single reference face shape," referenced above. The FRGC dataset is described in P. J. Phillips, et al., "Overview of the face recognition grand challenge," In 2005 IEEE Computer Society Conference on Computer Vision and Pattern Recognition CVPR'05), volume 1, pages 947-954. IEEE, 2005, which is hereby incorporated by reference in its entirety and for all purposes.

The reconstructed point cloud is registered using the Iterative Closest Point (ICP) algorithm, and the per-pixel depth error is calculated as shown in Table 1 below. As illustrated in Table 1, the reconstruction generated using the techniques described herein achieves the best results among all metrics.

TABLE 1

Quantitative comparison result on real-scanned depth data, where lower values indicate better results

| Reconstruction Method | Mean Absolute Error. (mm) | Root Mean Square Error. (mm) | 90% Depth Error. (mm) |
| --- | --- | --- | --- |
| Yue | 3.11 | 4.62 | 6.50 |
| Kemelmacher-Shlizerman | 3.846 | 4.91 | — |
| Techniques Described Herein | 3.32 | — | 6.69 |

To compare the results in a more intuitive way, the reconstruction techniques described herein can be applied to images for which other reconstruction techniques have been applied. The reconstruction result obtained using the techniques described herein shows better details and significantly more realism.

FIG. 11 is a flowchart illustrating an example of a process 1100 of generating one or more three-dimensional (3D) models using the techniques described herein. In some examples, the process 1100 can be performed by the system 200 shown in FIG. 2A. At operation 1102, the process 1100 includes obtaining an image of an object. The object can include a face, a vehicle, a building, or any other object.

At operation 1104, the process 1100 includes generating a 3D model of the object in the image. The 3D model includes geometry information. For instance, in some examples, the process 1100 can obtain a generic object model and can identify landmarks of the object in the image (e.g., the landmarks shown in FIG. 7A). The process 1100 can generate the 3D model by fitting the generic object model to the object in the image using the identified landmarks of the object. Fitting the generic object model to the object in the image can include modifying the positions of the vertices in the generic object model to better fit to the landmarks. In some examples, the fitting performed to generate the 3D model of the object at operation 1104 can include the initial fitting described above, such as a 3DMM fitting.

At operation 1106, the process 1100 includes determining color information for the 3D model. In some examples, the color information includes albedo color. At operation 1108, the process 1100 includes generating a fitted 3D model of the object based on a modification of the geometry information and the color information for the 3D model. In some implementations, the process 1100 can perform at least one vertex-level fitting of the 3D model. The at least one vertex-level fitting modifies the geometry information of the 3D model and determines the color information for the 3D model using an object parsing mask (e.g., a facial parsing mask). As described above, the object parsing mask defines one or more regions of the 3D model for color adjustment. In some aspects, performing the at least one vertex-level fitting of the 3D model includes performing a joint optimization of the geometry information and the color information, as described above.

As described above, in some implementations, the fitted 3D model of the object and determining the color information for the 3D model can be performed using the first and second vertex-level fitting processes 204 and 206 described above. For instance, performing the at least one vertex-level fitting of the 3D model can include identifying the one or more regions defined by the object parsing mask and performing a first vertex-level fitting of the 3D model to the object (e.g., the first vertex-level fitting process 204). The first vertex-level fitting modifies the geometry information of the 3D model by shifting each vertex of the 3D model to fit the object in the image. The first vertex-level fitting also determines the color information for each vertex of the 3D model. For instance, as described above, the process 1100 can determine, using a clustering algorithm (e.g., the K-means algorithm), a plurality of candidate colors for each vertex of the 3D model included in the one or more regions identified by the object parsing mask. The process 1100 can select, for each vertex included in the one or more regions identified by the object parsing mask, a brightest color (e.g., used as $C_{albedo}$ above) from the plurality of candidate colors determined for each vertex.

Performing the at least one vertex-level fitting of the 3D model can also include performing a second vertex-level fitting (e.g., the second vertex-level fitting process 206) of the 3D model to the object. The second vertex-level fitting adjusts the color information for each vertex of the 3D model included in the one or more regions identified by the object parsing mask.

At operation 1110, the process 1100 includes generating a refined 3D model of the object based on the fitted 3D model and depth information associated with the fitted 3D model. In some cases, the process 1100 can output the refined 3D model of the object. In some examples, generating the refined 3D model of the object includes performing a pixel-level refinement of the fitted 3D model, such as using the pixel-level refinement stage 208 described above. The pixel-level refinement adds the depth information to a portion of the fitted 3D model. For instance, using a refinement mask (e.g., an eye refinement mask), process 1100 can determine the portion of the fitted 3D model for adding the depth information using the pixel-level refinement. In examples, when the object includes a face, the refinement mask can include an eye refinement mask (or eye mask) indicating that the portion includes a region of the face outside of eye regions of the face. In some examples, as described above, the pixel-level refinement of the fitted 3D model can include generating an albedo image and a depth image for the fitted 3D model. The process 1100 can generate the refined 3D model using the albedo image and the depth image. In some implementations, the process 1100 can apply a smoothing function to the fitted 3D model. In some examples, the smoothing function includes a Discrete Laplacian Smoothing function.

In some examples, the processes described herein (e.g., process 210, 1100 and/or other processes described herein) may be performed by a computing device or apparatus. In one example, the process 1100 (and/or other processes described herein) can be performed by the system 200 of FIG. 2A. In another example, the process 1100 (and/or other processes described herein) can be performed by the computing system 1200 shown in FIG. 12. For instance, the computing system 1200 shown in FIG. 12 can include the components of the system 200 and can implement the operations of FIG. 11.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1100 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 210 and 1100 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 210, 1100, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
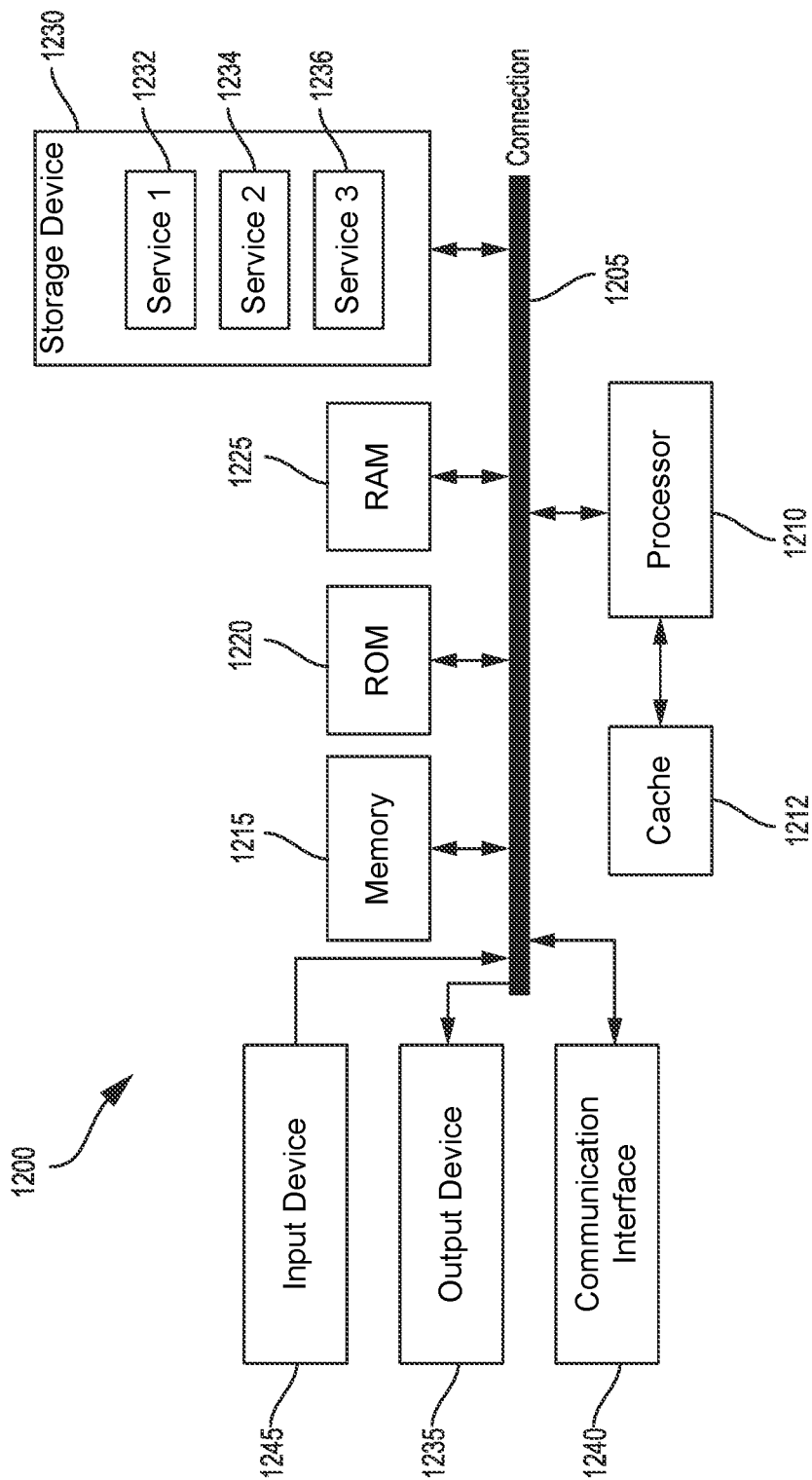
FIG. 12 is a diagram illustrating an example of a system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rack-mount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of generating one or more three-dimensional (3D) models, the method comprising:
    obtaining an image of an object;
    generating a 3D model of the object in the image, the 3D model including geometry information;
    determining, using an object parsing mask, color information for the 3D model, the object parsing mask defining one or more regions of the 3D model for color adjustment;
    generating a fitted 3D model of the object at least in part by modifying the geometry information for each vertex of the 3D model and adjusting color for each vertex of the 3D model using the color information determined using the object parsing mask; and
    performing a pixel-level refinement of the fitted 3D model to generate a refined 3D model of the object, the pixel-level refinement using depth information associated with the fitted 3D model to apply a pixel-level depth displacement to a portion of the fitted 3D model defined by a refinement mask, wherein the refinement mask indicates a position of the portion of the fitted 3D model for the pixel-level depth displacement.

2. The method of claim 1, wherein the color information includes albedo color.

3. The method of claim 1, wherein generating the 3D model of the object includes:
    obtaining a generic object model;
    identifying landmarks of the object in the image; and
    generating the 3D model by fitting the generic object model to the object in the image using the identified landmarks of the object.

4. The method of claim 1, wherein the fitted 3D model of the object is generated based on performing at least one vertex-level fitting of the 3D model.

5. The method of claim 4, wherein performing the at least one vertex-level fitting of the 3D model includes performing a joint optimization of the geometry information and the color information.

6. The method of claim 4, wherein performing the at least one vertex-level fitting of the 3D model includes:
    identifying the one or more regions defined by the object parsing mask;
    performing a first vertex-level fitting of the 3D model to the object, the first vertex-level fitting modifying the geometry information for each vertex of the 3D model by shifting each vertex of the 3D model to fit the object in the image, the first vertex-level fitting further determining the color information for each vertex of the 3D model; and
    performing a second vertex-level fitting of the 3D model to the object, the second vertex-level fitting adjusting the color for each vertex of the 3D model included in the one or more regions identified by the object parsing mask.

7. The method of claim 6, wherein determining the color information for each vertex of the 3D model includes:
    determining, using a clustering algorithm, a plurality of candidate colors for each vertex of the 3D model included in the one or more regions identified by the object parsing mask; and
    selecting, for each vertex included in the one or more regions identified by the object parsing mask, a brightest color from the plurality of candidate colors determined for each vertex.

8. The method of claim 7, wherein the clustering algorithm includes a K-means algorithm.

9. The method of claim 1, further comprising:
    determining, using the refinement mask, the portion of the fitted 3D model for applying the pixel-level depth displacement.

10. The method of claim 9, wherein the object includes a face, and wherein the refinement mask includes an eye mask indicating that the portion includes a region of the face outside of eye regions of the face.

11. The method of claim 1, wherein performing the pixel-level refinement of the fitted 3D model includes:
generating an albedo image and a depth image for the fitted 3D model; and
generating the refined 3D model using the albedo image and the depth image.

12. The method of claim 1, further comprising:
applying a smoothing function to the fitted 3D model.

13. The method of claim 12, wherein the smoothing function includes a Discrete Laplacian Smoothing function.

14. The method of claim 1, wherein the object is a face.

15. The method of claim 1, further comprising:
outputting the refined 3D model of the object.

16. An apparatus for generating one or more three-dimensional (3D) models, comprising:
a memory; and
one or more processors coupled to the memory, the one or more processors being configured to:
obtain an image of an object;
generate a 3D model of the object in the image, the 3D model including geometry information;
determine, using an object parsing mask, color information for the 3D model, the object parsing mask defining one or more regions of the 3D model for color adjustment;
generate a fitted 3D model of the object at least in part by modifying the geometry information for each vertex of the 3D model and adjusting color for each vertex of the 3D model using the color information determined using the object parsing mask; and
perform a pixel-level refinement of the fitted 3D model to generate a refined 3D model of the object, the pixel-level refinement using depth information associated with the fitted 3D model to apply a pixel-level depth displacement to a portion of the fitted 3D model defined by a refinement mask, wherein the refinement mask indicates a position of the portion of the fitted 3D model for the pixel-level depth displacement.

17. The apparatus of claim 16, wherein the color information includes albedo color.

18. The apparatus of claim 16, wherein the one or more processors are configured to generate the fitted 3D model of the object based on performing at least one vertex-level fitting of the 3D model.

19. The apparatus of claim 18, wherein the one or more processors are configured to perform the at least one vertex-level fitting of the 3D model at least in part by performing a joint optimization of the geometry information and the color information.

20. The apparatus of claim 18, wherein, to perform the at least one vertex-level fitting of the 3D model, the one or more processors are configured to:
identify the one or more regions defined by the object parsing mask;
perform a first vertex-level fitting of the 3D model to the object, the first vertex-level fitting modifying the geometry information for each vertex of the 3D model by shifting each vertex of the 3D model to fit the object in the image, the first vertex-level fitting further determining the color information for each vertex of the 3D model; and
perform a second vertex-level fitting of the 3D model to the object, the second vertex-level fitting adjusting the color for each vertex of the 3D model included in the one or more regions identified by the object parsing mask.

21. The apparatus of claim 20, wherein determining the color information for each vertex of the 3D model includes:
determining, using a clustering algorithm, a plurality of candidate colors for each vertex of the 3D model included in the one or more regions identified by the object parsing mask; and
selecting, for each vertex included in the one or more regions identified by the object parsing mask, a brightest color from the plurality of candidate colors determined for each vertex.

22. The apparatus of claim 21, wherein the clustering algorithm includes a K-means algorithm.

23. The apparatus of claim 16, where the one or more processors are configured to:
determine, using a refinement mask, the portion of the fitted 3D model for applying the pixel-level depth displacement.

24. The apparatus of claim 16, wherein performing the pixel-level refinement of the fitted 3D model includes:
generating an albedo image and a depth image for the fitted 3D model; and
generating the refined 3D model using the albedo image and the depth image.

25. The apparatus of claim 16, wherein the object is a face.

26. The apparatus of claim 16, wherein the apparatus includes a mobile device.

27. The apparatus of claim 16, wherein the apparatus includes a display configured to display the refined 3D model of the object.

28. The apparatus of claim 16, wherein the apparatus includes a camera configured to capture the image.

29. The apparatus of claim 16, wherein, to generate the 3D model of the object, the one or more processors are configured to:
obtain a generic object model;
identify landmarks of the object in the image; and
generate the 3D model by fitting the generic object model to the object in the image using the identified landmarks of the object.

30. A non-transitory computer-readable medium having stored thereon instructions that, when executed by one or more processors, cause the one or more processors to:
obtain an image of an object;
generate a 3D model of the object in the image, the 3D model including geometry information;
determine, using an object parsing mask, color information for the 3D model, the object parsing mask defining one or more regions of the 3D model for color adjustment;
generate a fitted 3D model of the object at least in part by modifying the geometry information for each vertex of the 3D model and adjusting color for each vertex of the 3D model using the color information determined using the object parsing mask; and
perform a pixel-level refinement of the fitted 3D model to generate a refined 3D model of the object, the pixel-level refinement using depth information associated with the fitted 3D model to apply a pixel-level depth displacement to a portion of the fitted 3D model defined by a refinement mask, wherein the refinement mask indicates a position of the portion of the fitted 3D model for the pixel-level depth displacement.

\* \* \* \* \*